(12) United States Patent
Le et al.

(10) Patent No.: US 11,575,589 B2
(45) Date of Patent: Feb. 7, 2023

(54) NETWORK TRAFFIC RULE IDENTIFICATION

(71) Applicant: International Business Machines Corporation, Armonk, NY (US)

(72) Inventors: Franck Vinh Le, West Palm Beach, FL (US); Supriyo Chakraborty, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/110,372

(22) Filed: Dec. 3, 2020

(65) Prior Publication Data

US 2022/0182302 A1 Jun. 9, 2022

(51) Int. Cl.
| | |
|---|---|
| *H04L 43/0811* | (2022.01) |
| *G06N 3/08* | (2006.01) |
| *H04L 41/14* | (2022.01) |
| *H04L 69/00* | (2022.01) |

(52) U.S. Cl.
CPC ............ *H04L 43/0811* (2013.01); *G06N 3/08* (2013.01); *H04L 41/14* (2013.01); *H04L 69/02* (2013.01)

(58) Field of Classification Search
None
See application file for complete search history.

(56) References Cited

U.S. PATENT DOCUMENTS

| | | | |
|---|---|---|---|
| 8,897,578 B2 | 11/2014 | Huang | |
| 10,176,336 B2 | 1/2019 | Navda | |
| 10,198,629 B2 | 2/2019 | Segalovitz | |
| 10,276,170 B2 | 4/2019 | Gruber | |
| 2005/0120243 A1* | 6/2005 | Palmer | H04L 63/1416 726/4 |
| 2015/0039751 A1 | 2/2015 | Harrigan | |

(Continued)

FOREIGN PATENT DOCUMENTS

| | | |
|---|---|---|
| CN | 109922081 A | 6/2019 |
| CN | 114598610 A | 6/2022 |
| DE | 102021128522 A1 | 6/2022 |

OTHER PUBLICATIONS

Disclosed Anonymously, "Method for Contextual Semantic Compression and Extraction", An IP.com Prior Art Database Technical Disclosure, IP.com No. IPCOM000261470D, IP.com Electronic Publication Date: Mar. 7, 2020, 7 pages.

(Continued)

*Primary Examiner* — Mohamed Ibrahim
(74) *Attorney, Agent, or Firm* — Aaron N. Pontikos; Stephen R. Yoder

(57) ABSTRACT

A computer implemented method for analyzing network connections includes identifying a connection of interest and a corresponding set of connection data. The method additionally includes generating one or more saliency maps corresponding to the connection of interest. The method additionally includes mapping the generated one or more saliency maps to underlying protocols and fields, and identifying one or more values corresponding to each of the underlying protocols and fields. The method additionally includes extracting general correspondences from the identified one or more values corresponding to each of the underlying protocols and fields.

17 Claims, 4 Drawing Sheets

(56) References Cited

U.S. PATENT DOCUMENTS

| | | | | |
|---|---|---|---|---|
| 2016/0086052 A1* | 3/2016 | Piekniewski | ........... | G06V 10/50 |
| | | | | 382/103 |
| 2016/0104054 A1* | 4/2016 | Lin | ........................ | G06T 11/60 |
| | | | | 382/192 |
| 2016/0205002 A1* | 7/2016 | Rieke | ...................... | H04L 43/04 |
| | | | | 709/224 |
| 2017/0308770 A1 | 10/2017 | Jetley | | |
| 2018/0324061 A1 | 11/2018 | Khanal | | |
| 2020/0106741 A1* | 4/2020 | Fandli | ................... | H04L 43/045 |
| 2020/0177638 A1* | 6/2020 | Salman | ................... | H04L 63/14 |
| 2021/0075689 A1* | 3/2021 | Ramanathan | ............ | G06N 3/08 |

OTHER PUBLICATIONS

Disclosed Anonymously, "Using Deep Learning on Rule-Based Malicious Traffic Detectors to Generate New Malicious-Like Traffic for Layer 4-7 Testing", An IP.com Prior Art Database Technical Disclosure, IP.com No. IPCOM000256739D, IP.com Electronic Publication Date: Dec. 26, 2018, 7 pages.

Gilpin et al., Explaining Explanations: An Overview of Interpretability of Machine Learning, arXiv:1806.00069v3 [cs.AI] Feb. 3, 2019, 10 pages.

Hwang et al., "An LSTM-Based Deep Learning Approach for Classifying Malicious Traffic at the Packet Level", Appl. Sci. 2019, MDPI, 14 pages.

Lapuschkin et al., "Unmasking Clever Hans Predictors and Assessing What Machines Really Learn", Nature Communications, 2019, 60 pages.

Le et al., "Semantic Aware Encrypted Traffic Analysis Cross Flow Correlation", An IP.com Prior Art Database Technical Disclosure, IP.com No. IPCOM000251829D, IP.com Electronic Publication Date: Dec. 5, 2017, 5 pages.

Ribeiro et al., ""Why Should I Trust You?" Explaining the Predictions of Any Classifier", Proceedings of NAACL-HLT 2016 (Demonstrations), pp. 97-101, San Diego, California, Jun. 12-17, 2016, © 2016 Association for Computational Linguistics, 5 pages.

Schneider et al., "Personalized Explanation for Machine Learning: A Conceptualization", Research Paper, Twenty-Seventh European Conference on Information Systems (ECIS2019), Stockholm-Uppsala, Sweden, 17 pages.

Simonyan et al., "Deep Inside Convolutional Networks: Visualising Image Classification Models and Saliency Maps", arXiv:1312.6034v2 [cs.CV] Apr. 19, 2014, 8 pages.

"Patents Act 1977: Combined Search and Examination Report under Sections 17 & 18(3)", Date of search: Jun. 14, 2022, Application No. GB211663 I.9, 12 pages.

* cited by examiner

NETWORK TRAFFIC RULE IDENTIFICATION

BACKGROUND

The present invention relates generally to the field of network analysis, and more specifically to detecting underlying rules in a network.

Deep learning provides high performance solutions for asset inventory, asset monitoring, and other network traffic analysis. Asset management for enterprise includes several key tasks, including asset inventory, asset lifecycle management, and asset monitoring. Deep models offer the capabilities of much higher performance with respect to metrics such as precision, recall, f1-score, and the like.

Saliency maps are an image processing technique used to differentiate visual features in images. For example, full color images are converted to black and white images in order to analyze and depict the strongest colors present in the image. Other examples may include using night vision technologies to detect and depict light sources, wherein green may be used to depict brightness and black depicts dark areas. Saliency map concepts are described herein as extended to applications beyond image analysis, and on the basis of features which may be used to describe data other than strictly image data.

SUMMARY

As disclosed herein, a computer implemented method for analyzing network connections includes identifying a connection of interest and a corresponding set of connection data. The method additionally includes generating one or more saliency maps corresponding to the connection of interest. The method additionally includes mapping the generated one or more saliency maps to underlying protocols and fields, and identifying one or more values corresponding to each of the underlying protocols and fields. The method additionally includes extracting general correspondences from the identified one or more values corresponding to each of the underlying protocols and fields. A computer program product and computer system corresponding to the method are also disclosed.

DETAILED DESCRIPTION

Saliency maps, as described with respect to deep learning, correspond to a visualization technique used to compute images. The technique is derived from the notion of saliency in image, which refers to unique features, such as pixels, resolution, etc., of the image in the context of visual processing. Said unique features uniquely depict locations of interest within an image, and a saliency map is a topographical representation of the locations of interest with respect to the image. Specifically, saliency maps represent the conspicuity or saliency of every location in the visual field via a scalar quantity, and ultimately guide the selection of unique locations based on the spatial distribution of saliency.

Figure 1:
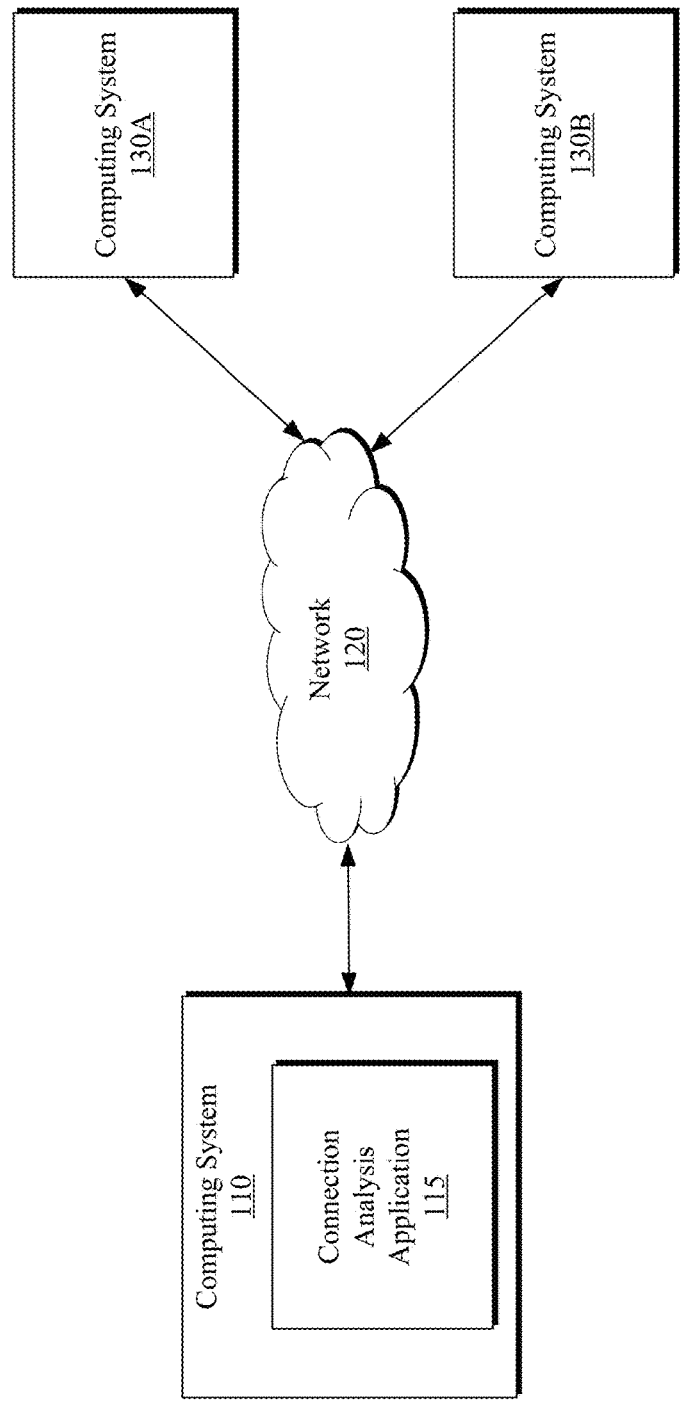
FIG. 1 is a block diagram depicting a network traffic analysis system in accordance with at least one embodiment of the present invention.

FIG. 1 is a block diagram depicting a network traffic analysis system 100 in accordance with at least one embodiment of the present invention. As depicted, network traffic analysis system 100 includes computing system 110, network 120, and computing systems 130. Network traffic analysis system 100 may enable analysis and identification of rules and dependencies with respect to connections within a system.

Computing system 110 can be a desktop computer, a laptop computer, a specialized computer server, or any other computer system known in the art. In some embodiments, computing system 110 represents computer systems utilizing clustered computers to act as a single pool of seamless resources. In general, computing system 110 is representative of any electronic device, or combination of electronic devices, capable of receiving and transmitting data, as described in greater detail with regard to FIG. 4. Computing system 110 may include internal and external hardware components, as depicted and described in further detail with respect to FIG. 4.

As depicted, computing system 110 includes connection analysis application 115. Connection analysis application 115 may be configured to execute a network traffic analysis method, such as the one described with respect to FIG. 2. Connection analysis application 115 may be capable of executing any of the operational steps detailed above or below. In at least some embodiments, connection analysis application 115 is configured to analyze connections between any of computing system 110 and computing systems 130A and 130B.

Computing systems 130 can each be a desktop computer, a laptop computer, a specialized computer server, or any other computer system known in the art. In some embodiments, computing systems 130 represent computer systems utilizing clustered computers to act as a single pool of seamless resources. In general, computing systems 130 are representative of any electronic device, or combination of electronic devices, capable of receiving and transmitting data, as described in greater detail with regard to FIG. 4. Computing systems 130 may include internal and external hardware components, as depicted and described in further detail with respect to FIG. 4.

Network 120 can be, for example, a local area network (LAN), a wide area network (WAN) such as the Internet, or a combination of the two, and include wired, wireless, or fiber optics connections. In general, network 120 can be any combination of connections and protocols that will support communications between computing system 110 and computing systems 130.

Figure 2:
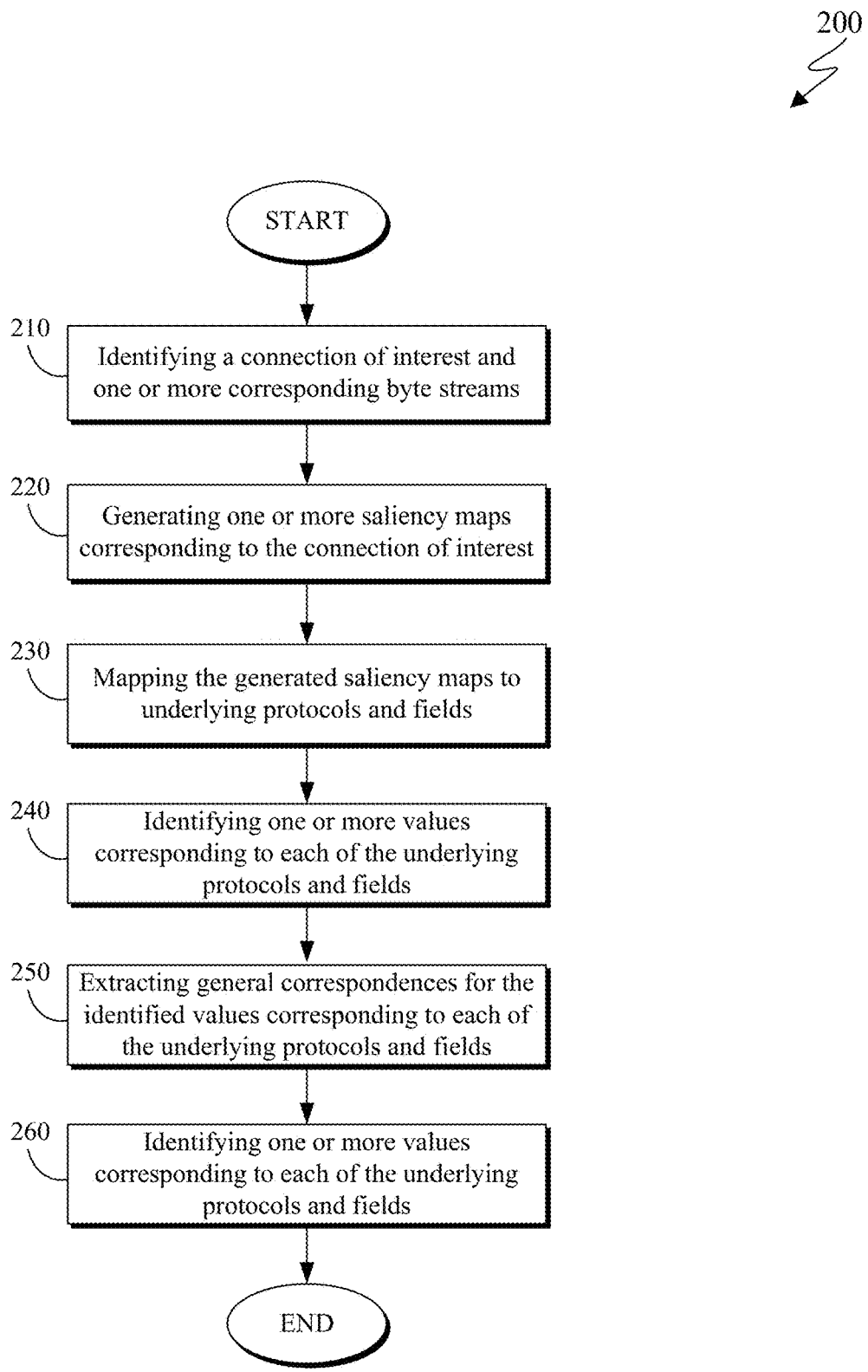
FIG. 2 is a flowchart depicting a network traffic analysis method in accordance with at least one embodiment of the present invention.

FIG. 2 is a flowchart depicting a network traffic analysis method 200 in accordance with at least one embodiment of the present invention. As depicted, network traffic analysis method 200 includes identifying (210) a connection of interest, generating (220) saliency maps corresponding to the connection of interest, mapping (230) the generated saliency maps to underlying protocols and fields, identifying (240) one or more values corresponding to each of the underlying protocols and fields, extracting (250) general correspondences from the identified one or more values corresponding to each of the underlying protocols and fields, and generating (260) general rules representing the extracted correspondences.

Identifying (210) a network or connection of interest may include receiving an indication of a connection or set of connections to be analyzed. In at least some embodiments, identifying (210) a connection of interest includes identifying a set of network traffic data. The network traffic data may include one or more byte streams. In at least some embodiments, identifying (210) a connection of interest includes identifying one or more well defined protocols through which data is sent respective to said connection of interest.

Generating (220) saliency maps corresponding to the connection of interest may include implementing attention-based modeling to data corresponding to the connection of interest. In at least some embodiments, generating (220) saliency maps corresponding to the connection of interest comprises applying an attention-based model to one or more byte streams corresponding to the connection of interest. The attention-based model may be configured to attribute attention weights to various portions of the byte stream. In at least some embodiments, the attention weights are applied to accurately reflect the importance of the analyzed portions of the byte stream. The attention model may divide attention into two types, global attention and local attention. In instances where global attention is implemented, attention is placed on all source positions within the byte stream; in instances where local attention is implemented, attention is placed only in a few source positions within the byte stream. With respect to local attention, the positions to which attention is paid correspond to positions most likely to contain impactful bytes. With respect to global attention, it may be unfeasible or inaccurate to place attention on certain bytes or another, so attention may be placed uniformly across all byte positions. In additional embodiments, local and global attention may refer to the diversification of how much attention is paid to a byte position. For example, a byte stream may be broken up into various larger chunks or segments. With respect to each of these segments, byte positions may carry unique "importance" or weight. Therefore, in such situations, local attention may be applied such that a byte position with respect to a first segment carries a first weight, and a byte in that same position with respect to a second segment carries a second weight. In embodiments where identification of such segments is not applicable, or where identification of the various byte positions cannot be accomplished prior to the analysis of the byte stream, global attention may instead be implemented so as to not improperly characterize values in the byte stream. In at least some embodiments, the attention based model used is trained on a raw TCP/UDP stream. The attention weights of the model provide the saliency maps by highlighting sequences of bytes that play an important role in the prediction.

Generating (220) saliency maps corresponding to the connection of interest may additionally include creating Gaussian pyramids to create feature maps with respect to one or more features of interest corresponding to the connection of interest. Pyramid representation is a type of multi-scale signal representation in which a signal or image is subject to repeated smoothing and subsampling. Pyramid representation can be divided into two main types, lowpass and bandpass. Creating a lowpass pyramid includes smoothing an image or a signal and subsampling the smoothed image, sometimes by a factor of 2 along each coordinate direction. The resultant image or signal is then subjected to the same procedure, and the cycle is executed repeatedly. Each cycle results in a smaller resultant image or signal with increased smoothing, but with decreased spatial sampling density. When executed with respect to an image, graphical representation of these results yields a pyramid, with the original image on top and the resultant images stacked on top of one another from there. Gaussian pyramids, specifically, are weighted down using a Gaussian average and scaled down accordingly. Each pixel or byte containing a local average corresponds to a neighborhood pixel or byte on a lower level of the pyramid.

In some embodiments, generating (220) saliency maps corresponding to the connection of interest includes aggregating one or more generated saliency maps across a class to form a rule for the class. To illustrate this point, one may want to look at all connections from devices from a specific vendor. Aggregating results across connections may reveal that having a value of V in a field k may be very distinctive of said specific vendor. For each input, a sliding window sums the attention weights of the sequence. The weights for each sequence are then calculated and summed across instances, wherein each instance may correspond to a separate connection. The goal of the window is to learn important sequences. To continue the above example, it may be revealed that a sequence of "A B C D" in the field k may be very distinctive of another vendor Embodiments of the present invention construct saliency maps according to byte values; in other words, with respect to a byte stream, each byte will have a value, and the saliency methods assign a relevance score to each byte. It should be appreciated that the importance of a value with respect to a byte is entirely dependent on the context of the byte stream, so it is impractical to try to generalize which values may be scored as important and which may not. The byte values may be assigned relevance scores prior to the byte stream being received in light of understood importance with respect to the context of the received byte stream.

Mapping (230) the generated saliency maps to underlying protocols and fields may include forging an association between portions of the byte stream received with respect to the connection of interest and underlying protocols which are indicated by said portions of the byte stream. For example, with respect to a TCP connection, bytes X to (X+K) for positions X and X+K may be highlighted by the saliency maps. Upon determination that these bytes or portions are of particular interest based on the results of the saliency map, mapping (230) the generated saliency maps to underlying protocols proceeds by identifying the position of said bytes, and processing whether said position corresponds to a particular field. Referring to the previously described TCP connection example, analysis of bytes X to X+K with respect to the TCP connection may yield that said bytes correspond to a User Agent field of the corresponding HTTP protocol. In this case, mapping (230) the generated saliency maps to underlying protocols and fields includes associating the relevant portions of the saliency maps (i.e. the portions corresponding to bytes X to X+K, for example) to the User Agent field which said portions affect.

Figure 3:
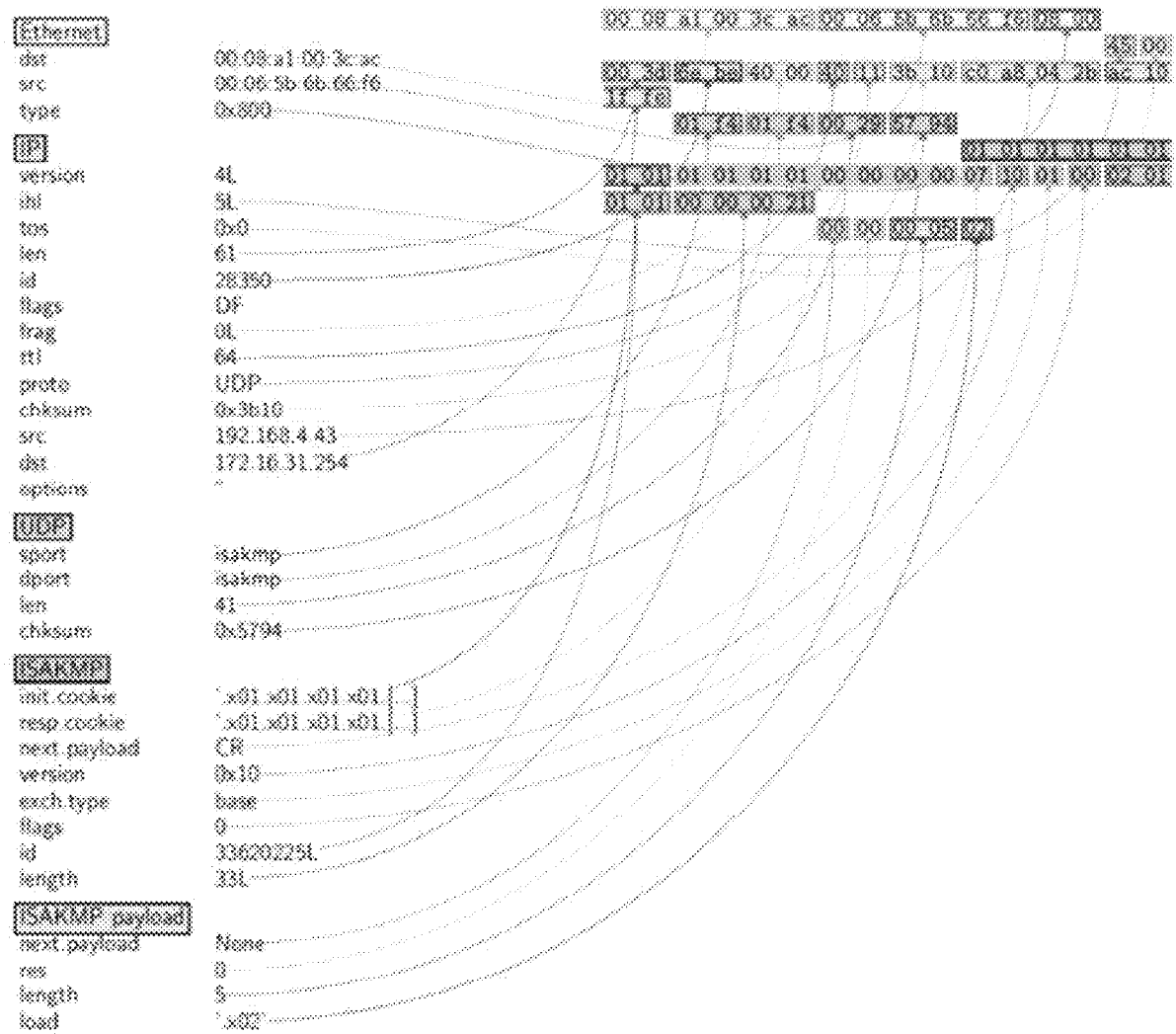
FIG. 3 depicts an example byte stream mapping in accordance with at least one embodiment of the present invention.

FIG. 3 depicts one example of a process for mapping sections of a byte stream to underlying protocol structure and fields. As depicted, the byte stream is segmented into sections, as indicated by the greyscale. Each of these sections is identified as corresponding to one or more fields within the depicted protocol structure(s). As depicted, various sections of the byte stream correspond to a plurality of protocol structure types. These correspondences are depicted by the lines connecting each section of the byte stream to one or more fields in one or more of the underlying protocol structures. It should be appreciated that FIG. 3 corresponds to only a single example of a mapping from saliency map (or byte stream) to underlying fields and protocols. There may exist embodiments in which some Identifying (240) one or more values corresponding to each of the underlying protocols and fields may include identifying at least one value corresponding to each of the fields identified with respect to the associations between the generated saliency map and the connection of interest.

Extracting (250) general correspondences from the identified one or more values corresponding to each of the underlying protocols and fields may include identifying one or more entities or features that are indicated by the identified by the one or more values corresponding o each of the underlying protocols and fields. For example, in some cases, values with respect to certain fields may be indicative of a network address indicating an entity or device that may be providing or receiving data corresponding to the appropriate field or underlying protocol. In other words, the identified one or more values may indicate one or more entities, devices, or addresses that impact or contribute to portions of byte streams being transmitted across the connection of interest that are most important according to attention modeling. For example, consider a circumstance in which five portions of a byte stream are identified as high importance according to a corresponding attention based model. These portions may be the portions to which the most attention is paid; that is, the portions which are viewed or interacted with the most. In this embodiment, four of the identified portions of the byte stream correspond to a network address X. In other words, in one way or another, these portions of the byte stream either impact or are impacted by a device located at network address X. In such a case, one may consider that data provided by, or provided to, the device corresponding to network address X is of high importance.

In additional embodiments, extracting (250) general correspondences from the identified one or more values corresponding to each of the underlying protocols and fields additionally includes determining whether the identified one or more values share a relationship with one another. For example, two portions of the byte stream may correspond to requests or commands which are dependent on one another. A simple exemplary embodiment would be one in which an initial identified portion of a byte stream provides some data X, and a later portion of the byte stream utilizes some portion of the data X. Such portions may be tagged or labeled as corresponding to or relying on one another.

Generating (260) general rules representing the extracted correspondences may include determining whether or not trends exist between identified portions of the byte streams, values identified with respect to the identified portions, and correspondences. For example, generating (260) general rules representing the extracted correspondences may include determining that each portion of the byte stream indicating a value of X has been identified as important. A corresponding rule may then be generated such that as soon as it is determined that a portion of the byte stream corresponds to said value X, said portion may promptly be marked as important prior to any additional analysis. For example, it may be determined that, if a byte stream has a certain value V in position k, then the corresponding device is establishing a connection to a server X. Identifying such correspondences may enable creation of subsequent rules as well based on assumptions that can be made in light of said correspondences. In other embodiments, generating (260) general rules representing the extracted correspondences includes determining whether all instances of a value correspond to data received from a particular location; in such embodiments, the rule may indicate that any byte stream portion with a value X in a particular field corresponds to data provided by a particular device. Generating such a rule may eliminate a need for up front analysis with respect to subsequent connections, thereby eliminating a need for additional processing.

Figure 4:
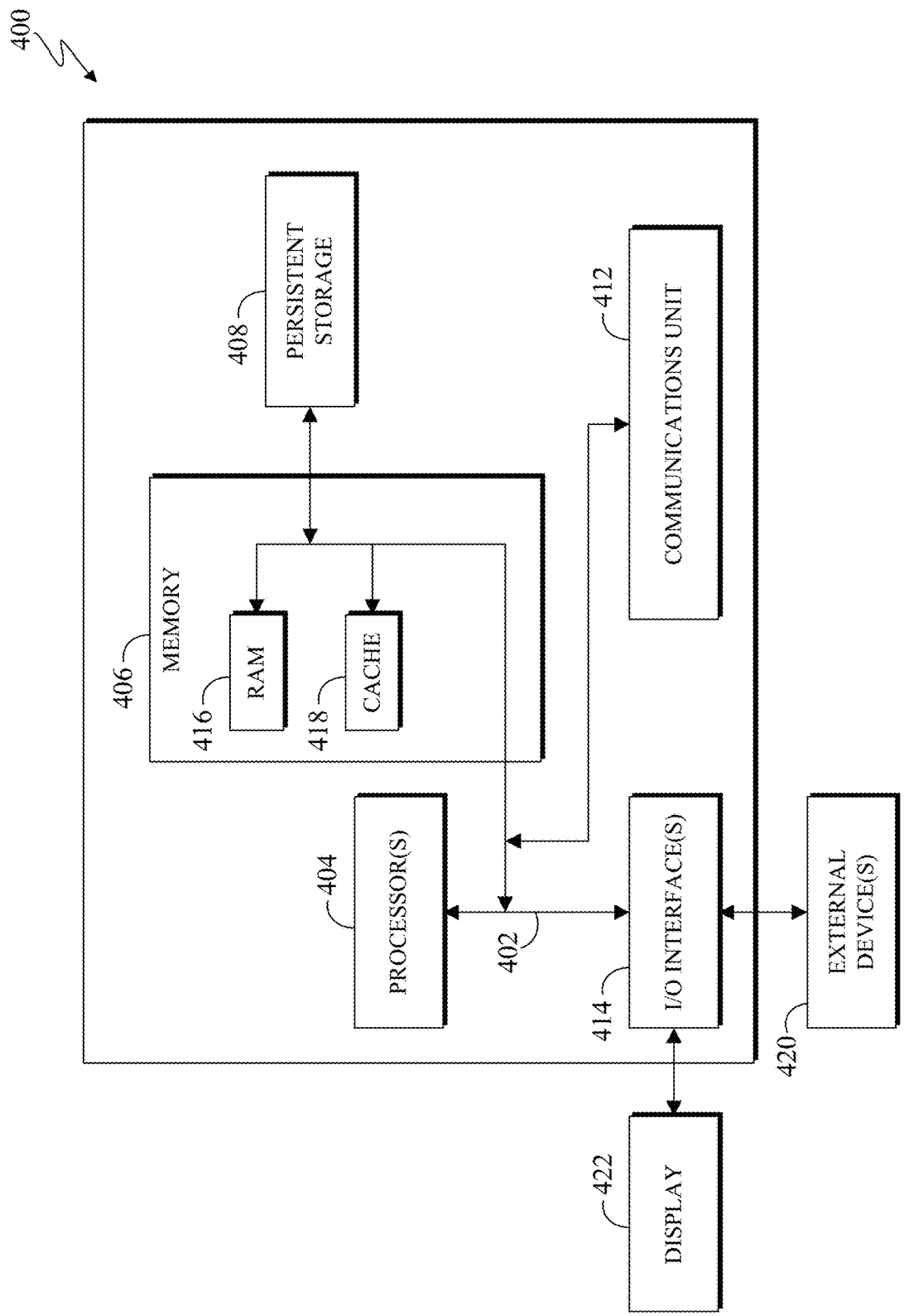
FIG. 4 is a block diagram of components of a computing system executing the image analysis system in accordance with an embodiment of the present invention.

FIG. 4 depicts a block diagram of components of computing system 110 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for analyzing network connections, the method comprising:
   identifying a connection of interest and a corresponding set of connection data;
   generating one or more saliency maps representative of data transmitted via the connection of interest, wherein generating the one or more saliency maps comprises creating a map indicating emphasis directed towards one or more portions of the data transmitted via the connection of interest;
   mapping the generated one or more saliency maps to underlying protocols and fields;
   identifying one or more values corresponding to each of the underlying protocols and fields; and
   extracting general correspondences from the identified one or more values corresponding to each of the underlying protocols and fields.

2. The computer implemented method of claim 1, wherein the corresponding set of connection data includes one or more byte streams.

3. The computer implemented method of claim 2, wherein generating one or more saliency maps corresponding to the connection of interest includes generating one or more saliency maps corresponding to the one or more byte streams such that portions of the byte stream are highlighted according to the attention that is paid to them.

4. The computer implemented method of claim 3, wherein mapping the generated one or more saliency maps to underlying protocols and fields includes mapping one or more portions of the byte stream to underlying fields or protocols impacted by the one or more portions of the byte stream.

5. The computer implemented method of claim 2, wherein generating saliency maps corresponding to the connection of interest includes:
   identifying a context corresponding to the received one or more byte streams;
   analyzing the byte stream to determine importance levels corresponding to one or more values in the byte stream with respect to the identified context; and
   assigning one or more weights to the values in the byte stream based on the determined importance levels.

6. The computer implemented method of claim 1, further comprising generating general rules representing the extracted correspondences.

7. A computer program product for analyzing network connections, the computer program product comprising: one or more computer readable storage media and program instructions stored on the one or more computer readable storage media, the program instructions comprising instructions to:
   identify a connection of interest;
   generate one or more saliency maps representative of data transmitted via the connection of interest, wherein generating one or more saliency maps comprises creating a map indicating emphasis directed towards one or more portions of the data transmitted via the connection of interest;
   map the generated saliency maps to underlying protocols and fields;
   identify one or more values corresponding to each of the underlying protocols and fields; and
   extract general correspondences from the identified one or more values corresponding to each of the underlying protocols and fields.

8. The computer program product of claim 7, wherein the corresponding set of connection data includes one or more byte streams.

9. The computer program product of claim 8, wherein instructions to generate one or more saliency maps corresponding to the connection of interest comprise instructions to generate one or more saliency maps corresponding to the one or more byte streams such that portions of the byte stream are highlighted according to the attention that is paid to them.

10. The computer program product of claim 9, wherein instructions to map the generated one or more saliency maps to underlying protocols and fields comprise instructions to map one or more portions of the byte stream to underlying fields or protocols impacted by the one or more portions of the byte stream.

11. The computer program product of claim 8, wherein instructions to generate saliency maps corresponding to the connection of interest comprise instructions to:
    identify a context corresponding to the received one or more byte streams;
    analyze the byte stream to determine importance levels corresponding to one or more values in the byte stream with respect to the identified context; and
    assign one or more weights to the values in the byte stream based on the determined importance levels.

12. The computer program product of claim 7, further comprising instructions to generate general rules representing the extracted correspondences.

13. A computer system for analyzing network connections, the computer system comprising:
    one or more computer processors;
    one or more computer-readable storage media;
    program instructions stored on the computer-readable storage media for execution by at least one of the one or more processors, the program instructions comprising instructions to:
    identify a connection of interest;
    generate one or more saliency maps representative of data transmitted via the connection of interest, wherein generating one or more saliency comprises creating a map indicating emphasis directed towards one or more portions of the data transmitted via the connection of interest;
    map the generated saliency maps to underlying protocols and fields;
    identify one or more values corresponding to each of the underlying protocols and fields; and extract general correspondences from the identified one or more values corresponding to each of the underlying protocols and fields.

14. The computer system of claim 13, wherein the corresponding set of connection data includes one or more byte streams.

15. The system of claim 14, wherein instructions to generate one or more saliency maps corresponding to the connection of interest comprise instructions to generate one or more saliency maps corresponding to the one or more byte streams such that portions of the byte stream are highlighted according to the attention that is paid to them.

16. The computer system of claim 15, wherein instructions to map the generated one or more saliency maps to underlying protocols and fields comprise instructions to map one or more portions of the byte stream to underlying fields or protocols impacted by the one or more portions of the byte stream.

17. The computer system of claim 13, further comprising instructions to generate general rules representing the extracted correspondences.

\* \* \* \* \*